United States Patent [19]
Hook

[11] Patent Number: 6,013,177
[45] Date of Patent: Jan. 11, 2000

[54] SILO AND PROCESS FOR DECONTAMINATING AND COMPOSTING SEWAGE SLUDGE

[76] Inventor: Richard Hook, 176 Sharon Lake Ct., Lexington, S.C. 29072

[21] Appl. No.: 08/614,170

[22] Filed: Mar. 8, 1996

[51] Int. Cl.[7] .................... C02F 11/16; C05F 9/04
[52] U.S. Cl. ................ 210/96.1; 210/199; 71/9; 435/290.1; 435/294.1
[58] Field of Search .............. 71/9; 435/290.4, 435/291.3, 291.4, 294.1, 296.1, 818, 290.1; 210/199, 96.1

[56] References Cited

U.S. PATENT DOCUMENTS

| | | | |
|---|---|---|---|
| 1,456,332 | 5/1923 | Nash | 71/9 |
| 1,595,445 | 8/1926 | Boggiano-Pico | 71/9 |
| 1,832,179 | 11/1931 | Boggiano-Pico | 71/9 |
| 2,474,833 | 7/1949 | Eweson | 71/9 |
| 2,639,902 | 5/1953 | Kuebler | 71/9 |
| 2,680,069 | 6/1954 | Eweson | 71/9 |
| 2,878,112 | 3/1959 | Morrison | 71/9 |
| 3,055,744 | 9/1962 | Petersen | 71/9 |
| 3,314,765 | 4/1967 | Abson et al. | 71/9 |
| 3,756,784 | 9/1973 | Pittwood | 71/9 |
| 3,853,480 | 12/1974 | Kaelin | 71/9 |
| 3,960,537 | 6/1976 | Kaelin | 71/9 |
| 4,062,770 | 12/1977 | Kneer | 71/9 |
| 4,135,908 | 1/1979 | Widmer | 71/9 |
| 4,184,269 | 1/1980 | Kneer | 71/9 |
| 4,203,755 | 5/1980 | Ruckstuhl | 71/9 |
| 4,249,929 | 2/1981 | Kneer | 71/9 |
| 4,374,804 | 2/1983 | Easter, II | 71/9 |
| 4,384,878 | 5/1983 | Nordlund et al. | 71/9 |
| 4,392,881 | 7/1983 | Kneer | 71/9 |
| 4,410,349 | 10/1983 | Laurenson, Jr. | 71/9 |
| 4,521,517 | 6/1985 | Gauthier | 71/9 |
| 4,721,585 | 1/1988 | Melchiorri Santolini et al. | 71/9 |
| 4,758,344 | 7/1988 | Wildenauer | 71/9 |
| 4,909,825 | 3/1990 | Eigner | 71/9 |
| 5,234,596 | 8/1993 | Greeb | 71/9 |
| 5,258,306 | 11/1993 | Goldfarb | 435/315 |
| 5,269,829 | 12/1993 | Meyer | 71/9 |

*Primary Examiner*—David A. Simmons
*Assistant Examiner*—Frank M. Lawrence

[57] ABSTRACT

A silo and process for decontaminating sewage sludge comprising a vertical silo within which are a plurality of discrete levels, each level having at least one air inlet pipe and at least one air outlet tube, a plurality of monitors for temperature and moisture, a central shaft through which air may travel, and at least one oxygen monitor; loading of herbaceous material in the upper portion of the silo; spraying sewage sludge onto the herbaceous material as it enters the silo to produce an herbaceous material-sewage sludge mixture; monitoring at least one parameter at each of the discrete levels; unloading the mixture from the lower portion of the silo; reloading some portion of the mixture into the upper portion of the silo; and collecting some portion of the mixture for further treatment.

6 Claims, 4 Drawing Sheets

SILO AND PROCESS FOR DECONTAMINATING AND COMPOSTING SEWAGE SLUDGE

The present invention relates generally to composting and more specifically to a vertical silo and method for decontaminating and composting sludge material from a municipal waste water treatment facility.

BACKGROUND OF THE INVENTION

Municipalities have waste treatment facilities to treat vast quantities of sewage. One product of the treatment process is sewage sludge. This type waste material is typically banned from landfill sites because of the risk of bacterial contamination of soil, bodies of water, and groundwater. This sludge must be decomposed in some manner so as to render it harmless to the environment. The advantages of composting organic materials to provide fertilizers and soil additives are well-known. The length of time and amount of ground space required in traditional backyard gardening techniques of composting are prohibitive for the large volume of sewage sludge generated by a municipality sewage treatment facility. Several processes have been developed to decompose sewage sludge to a satisfactory condition for exposure to the environment.

One such process measures the $O_2$ content of waste air evacuated from a reaction vessel so that the aeration air flow may be adjusted at any time during the process to the level required for optimum composting. Another such process controls the throughput rate of the aeration air flowing through a reaction vessel such that the $O_2$ content or the corresponding $CO_2$ content of the waste air takes a desired value set externally. A third known process does not adjust the throughput rate of the aeration air, but rather fixedly sets the throughput rate without consideration to the $O_2$ or $CO_2$ contents.

These processes may compost sewage sludge to an environmentally safe level, but they require either multiple vessels, significant amounts of land, or great lengths of time to obtain these results. What is needed is a process utilizing a single vessel capable of quickly decontaminating sewage sludge by bacterial action to an environmentally safe level as specified by the Environmental Protection Agency such that the sludge is decontaminated and may be processed further without the need for expensive infrastructure.

SUMMARY OF THE INVENTION

Accordingly, the present invention provides a device and method for decomposing sewage sludge to an acceptable level within environmental regulations and producing a natural fertilizing material within a relatively short period of time. The optimum sewage sludge is a liquified composite rather than a sewage cake commonly used in the industry.

It is an object of the present invention to provide a vertical silo in which sewage sludge and herbaceous material are combined and composted.

Another object of the present invention is to provide a device and process for composting sewage sludge to an environmentally acceptable level of decomposition within a relatively short period of time.

Yet another object of the present invention is to provide a device and process for composting sewage sludge in an economically efficient manner.

BRIEF DESCRIPTION OF THE DRAWINGS

The above and other objects, features and advantages of the present invention will become apparent from the following description of the invention and the appended claims, taken in conjunction with the accompanying drawings, in which:

DETAILED DESCRIPTION OF THE PRESENTLY PREFERRED EXEMPLARY EMBODIMENT

Figure 1:
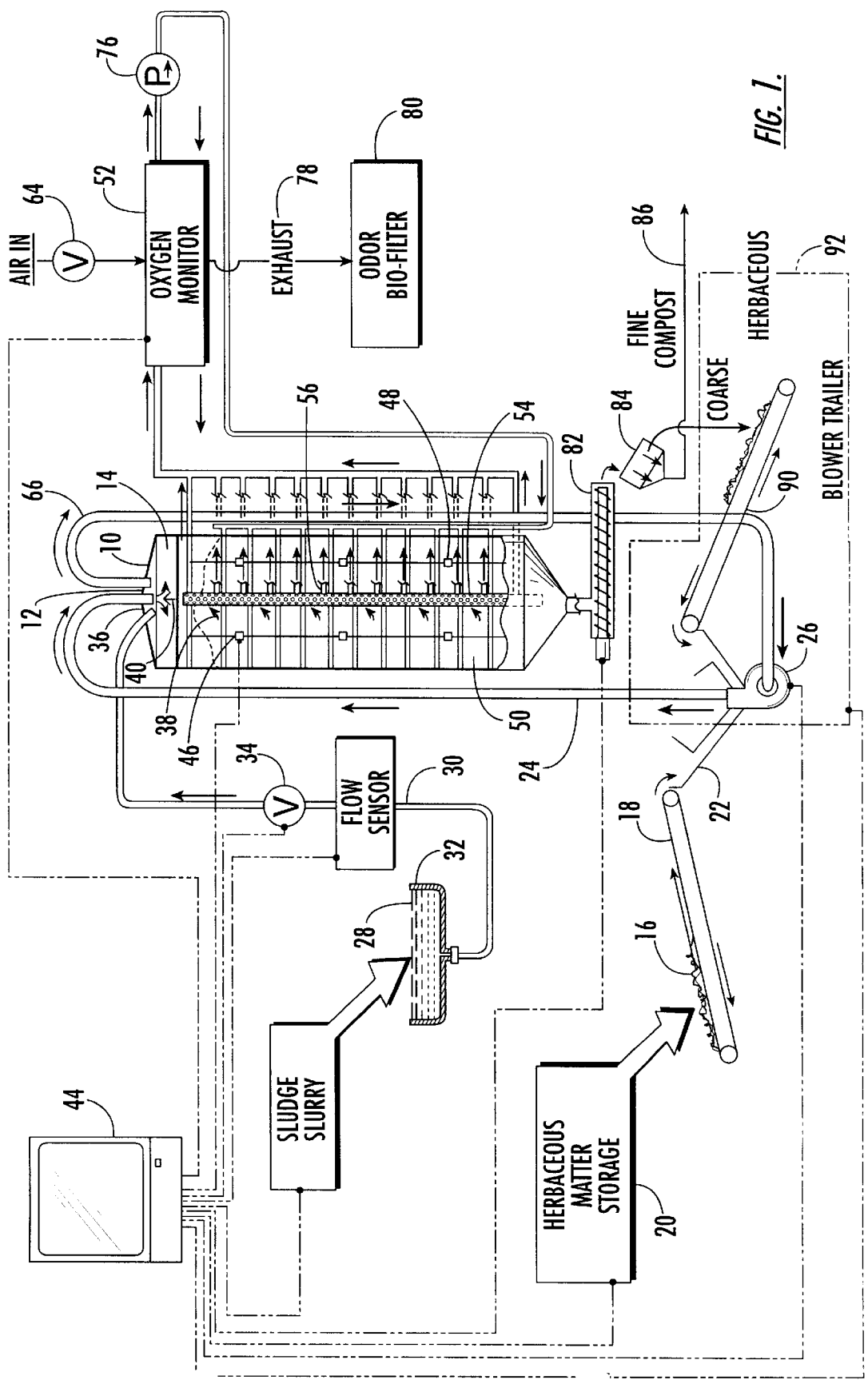
FIG. 1 shows a schematic of the device of the present invention with the vertical silo in partial cross-section.

The vertical silo 10 of the present invention, as shown in cross-section in FIG. 1, has a conventional feed opening 12 at the upper portion 14. Herbaceous material 16 is transported to opening 12 by conventional means such as a conveyor belt 18 moving herbaceous material 16 from a storage facility 20 to a trough 22 which directs herbaceous material 16 into a pipe 24 connected to a blower 26 which blows herbaceous material 16 up through pipe 24 and into opening 12 in upper portion 14. Initial startup involves loading only herbaceous material 16. As it is augured out at the bottom of silo 10 (explained below), it is recirculated back through silo 10. When herbaceous material 16 enters opening 12 it is sprayed with sewage sludge 28 delivered into upper portion 14 by conventional means such as piping 30 from a holding tank 32. A valve 34 in piping 30 may control the amount of sludge flowing into silo 10 and spraying onto herbaceous material 16 at upper portion 14 through a nozzle 36 connected to the distal end of piping 30. Herbaceous material-sewage sludge mixture 38 then falls by gravity across a diverter 40 and into the interior cavity 50 of silo 10. As mixture 38 falls through cavity 50, it passes various discrete levels 42 of silo 10. When the filling process involving mixture 38 is complete for the first time, opening 12 at upper portion 14 may be closed forming a closed system. Maintenance of optimal moisture, oxygen, and temperature levels is controlled by a computer system 44 which receives readings from temperature monitors 46 and moisture monitors 48, located within each of discrete levels 42, and $O_2$ monitor 64, and makes calculations to determine if adjustments must be made in any of discrete levels 42.

Figure 2:
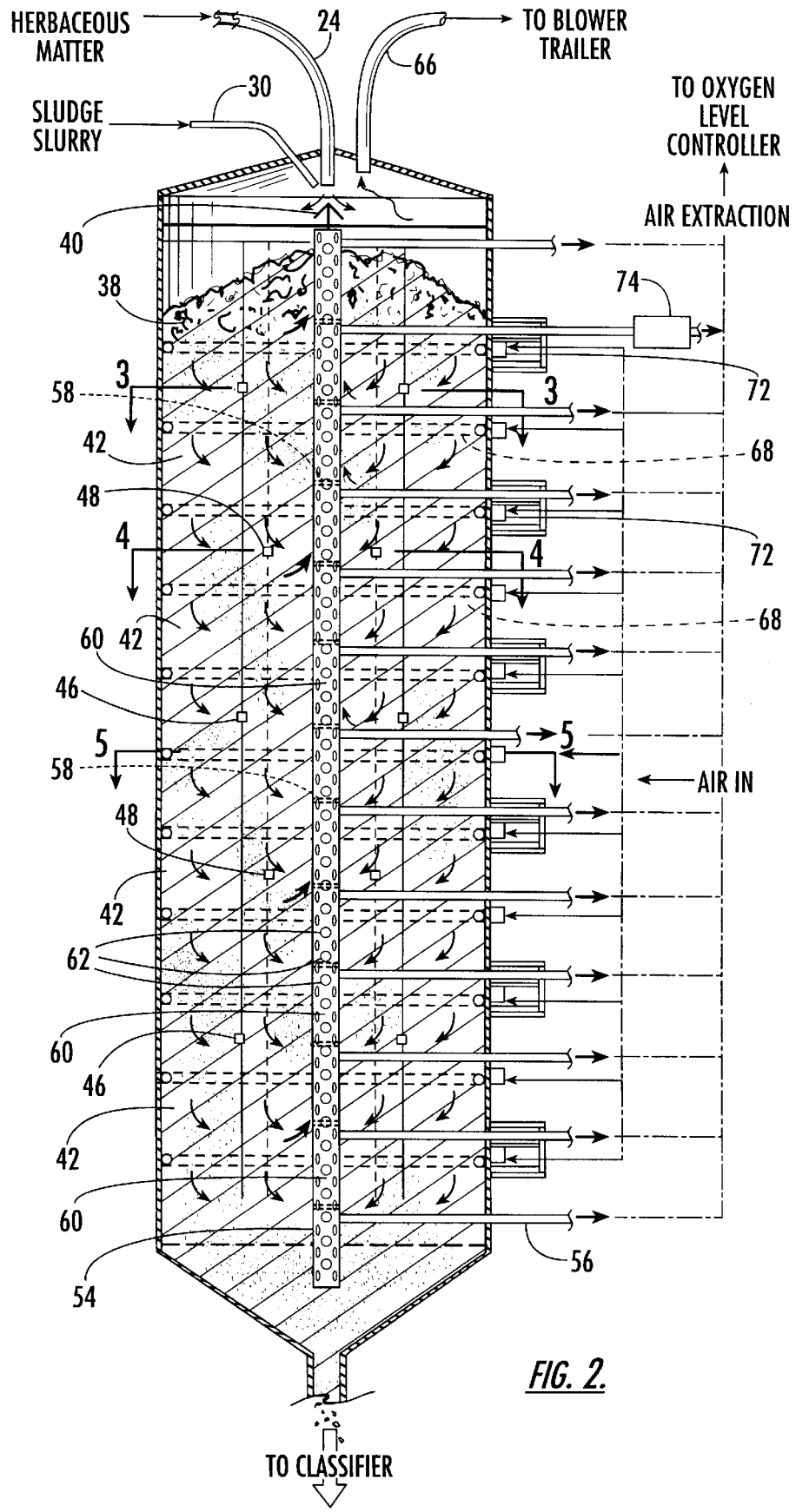
FIG. 2 is a cross-sectional view of the vertical silo.

FIG. 2 shows discrete levels 42 in more detail. A central vertical air extraction column 54 extends through the center of silo 10. Column 54 has an air extraction tube 56 at each of discrete levels 42 throughout silo 10. Central column 54 contains separation walls 58 to create separate sections 60 of central column 54 to coordinate with each of discrete levels 42. Each section 60 has one air extraction tube 56 at its upper portion to remove air within that coordinating discrete level 42. Each section 60 of column 54 has multiple openings 62 covered by mesh screening to allow air to be pulled into column 54. Air is then pulled through extraction tube 56 at that level 42 and out to oxygen monitor 64 controlled by computer system 44 such that the oxygen of each level may be measured independently. Ambient air in upper portion 14 is drawn out through recycling piping 66 and some portion is recycled through blower 26. Because the air from each level 42 is heated by the decomposing activity therein, there is normally no need for the recirculated air to be heated by external means. However, if supplemental heating of the recirculating air is desirable, this may be accomplished by means well established in the industry.

Air inlet piping 68, illustrated by dashed lines in FIG. 2, provides a controlled source of air to each of discrete levels 42 within silo 10. Air inlet piping 68 is preferably circular piping arranged about the inner circumference of silo 10 at an appropriate location within each of discrete levels 42.

Figure 6:
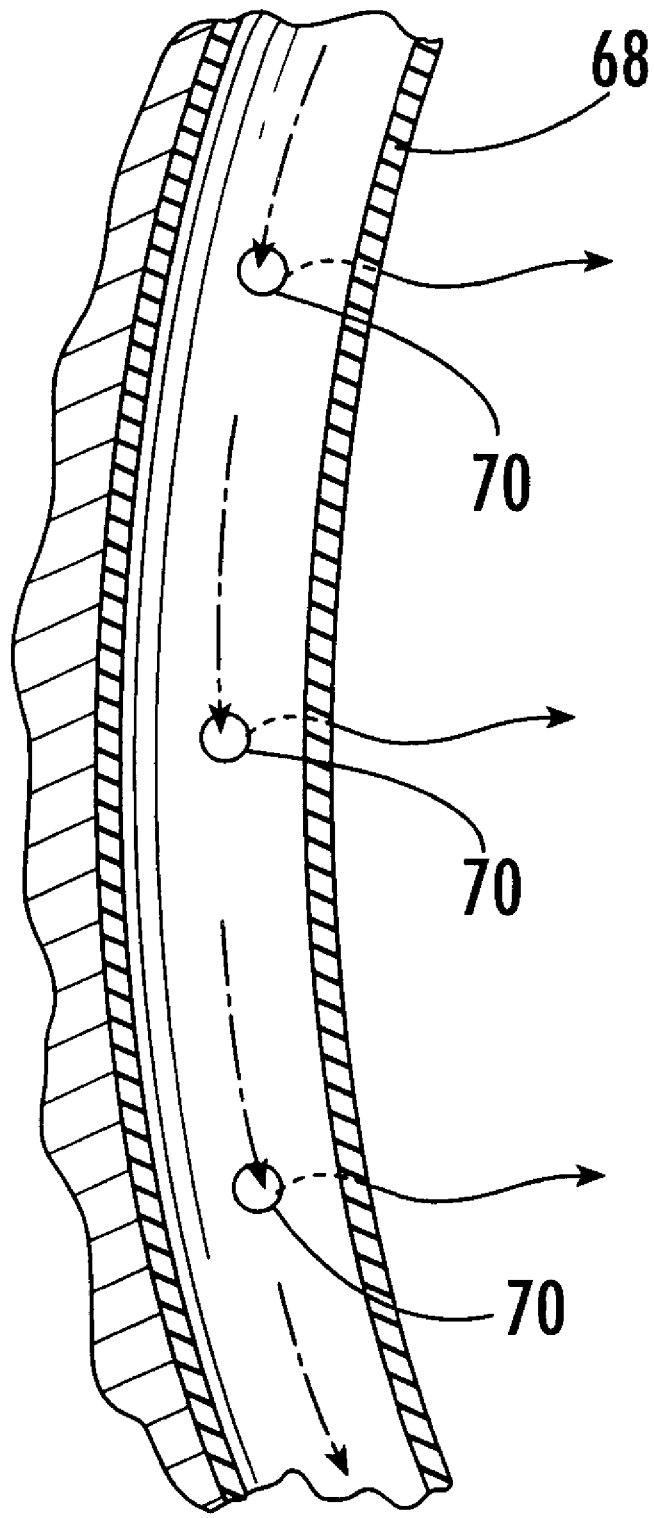
FIG. 6 is a partial cross-sectional view of the air inlet tubing of the silo of the present invention.

FIG. 6 illustrates the location of multiple openings 70 on the lower surface of air inlet piping 68 through which air is released from air inlet piping 68 into discrete level 42 as needed to optimize the composting of herbaceous material-sewage sludge mixture 38 therein.

Referring again to FIG. 2, the curved arrows depict the general flow of air from openings 70 in air inlet piping 68 downward and toward vertical column 54 through herbaceous material-sewage sludge mixture 38. The air inflow through each level 42 is controlled by outlet valves 72 on each of air inlet piping 68 and inlet valve 74 connected to computer system 44. An oxygen monitor 52 monitors the $O_2$ level as air travels from air extraction tube 56, through a pump 76, and into air inlet piping 68 through inlet valve 74 to be directed back into herbaceous material-sewage sludge mixture 38 in silo 10. Moisture monitor 48 alerts to the need for additional moisture. Water may be fine-misted into line 68 to adjust moisture at that level 42. Any air with less than sufficient $O_2$ is diverted as exhaust 78 to an odor bio-filter 80. Bio-filter 80 may be any of a variety of suitable filters capable of trapping and containing offensive odors.

As herbaceous material-sewage sludge mixture 38 decontaminates to an acceptable level, it also reaches the lower portion of silo 10 and may be removed therefrom. A suitable means for removal is an auger 82 which transports mixture 38 to a trommel 84 where fine compost is conveyed by conveyor 86 to an off-load transporter 88 (not shown), and coarse compost is conveyed by conveyor 90 back to blower trailer 92 where it is combined with herbaceous material 16 at blower 26.

Figure 3:
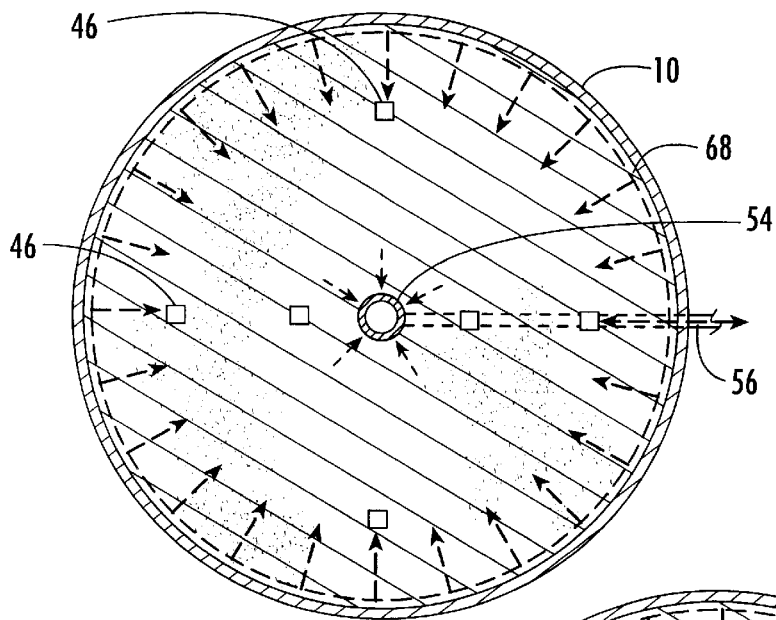
FIG. 3 is a sectional view of the silo along the line 3—3 of FIG. 2.
Figure 4:
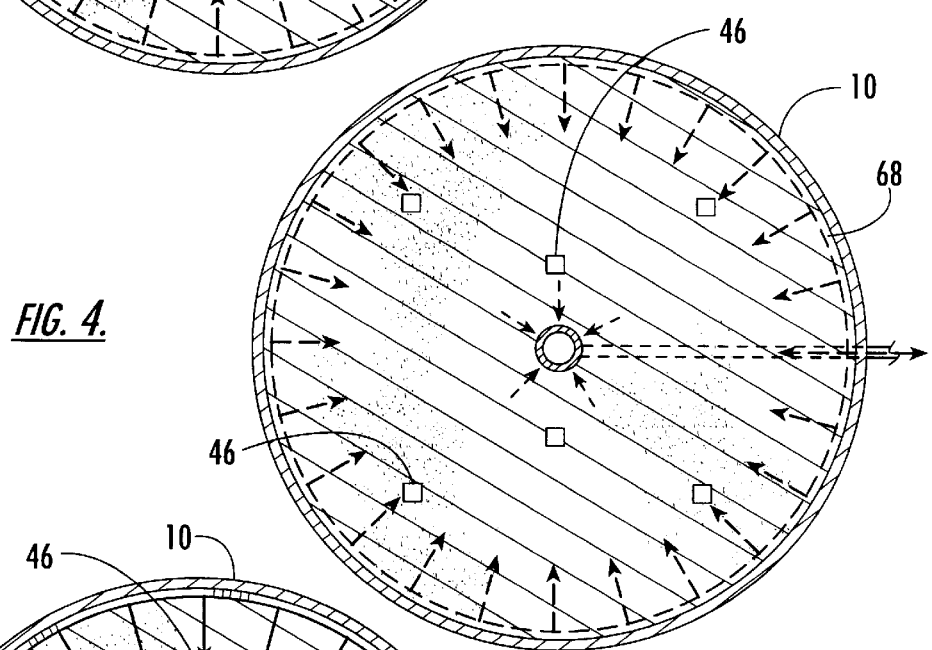
FIG. 4 is a sectional view of the silo along the line 4—4 of FIG. 2.
Figure 5:
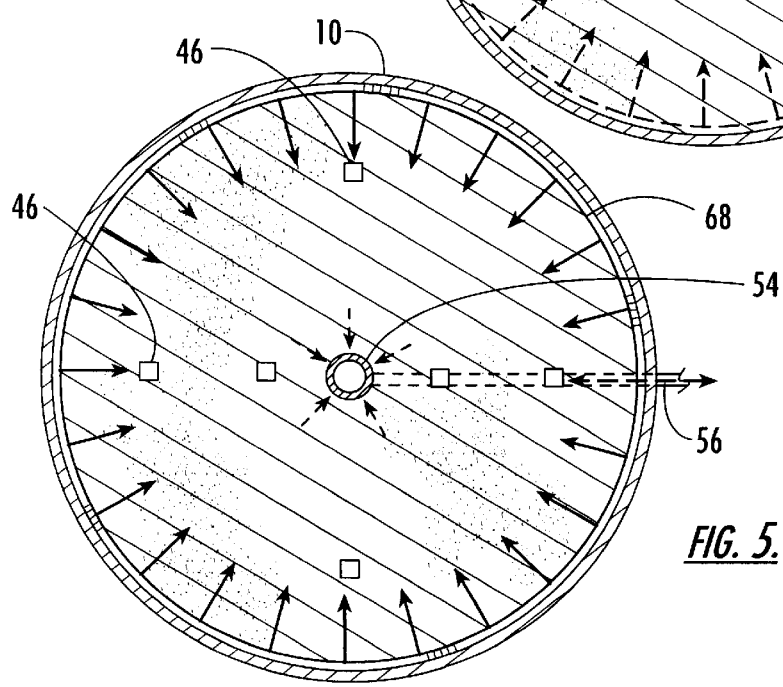
FIG. 5 is a sectional view of the silo along the line 5—5 of FIG. 2.

FIGS. 3, 4, and 5 illustrate cross-section s of silo 10 through those portions denoted by lines 3—3, 4—4, and 5—5, respectively, of FIG. 2. Air from air inlet piping 68 at the inner circumference of silo 10 is denoted by dashed arrows. Temperature monitors 46 are located at various sites of each of discrete levels 42. Moisture monitors 48 are also located throughout each of discrete levels 42. All monitors are connected to computer system 44 in order to provide continuous readings at each level within silo 10. For example, if the temperature rises or falls outside the optimum range for maximum composting, computer system 44 activates or deactivates pump 76 to provide or shut off air supply by opening air inlet valve 74 and air outlet valve 72 to level 42 with the less than optimum temperature reading. By continuously monitoring conditions within each level 42, and making adjustments t o obtain optimum conditions within each level 42, rapid decontamination is attained.

Herbaceous material-sewage sludge mixture 38 which is rich in beneficial bacteria may be extracted through the side of silo 10 by an a uger and fed to chute 22 to be mixed with herbaceous material 16 and sewage sludge 28. The extraction and recirculating of mixture 38 by auger will seed herbaceous material 16 and sewage sludge 28 with beneficial bacteria and result in faster attainment of optimal conditions and faster throughput through silo 10.

Although a specific embodiment of the invention has been depicted, various modifications may be made in the design of the silo and components without departing from the spirit and scope of the invention. Other variations in the implementation of the invention will be apparent to those of skill in the art.

What is claimed is:

1. A device for decontaminating compostable material comprising:

a vertical silo within which are a plurality of discrete levels without separating partitions, each level having at least one air inlet pipe and at least one air inlet pipe and at least one air extraction tube;

a central shaft in communication with each of said at least one air extraction tube through which air may travel;

each of said air inlet pipes further comprises a circular piping located at the interior circumference of said each level, wherein said circular piping further comprises apertures in the lower portion thereof, said apertures of sufficient size and number so as to direct air traveling through said inlet pipe and said circular piping to exit said central shaft by way of a parabolic path through said compostable material; and each of said levels having a plurality of monitors.

2. A device as in claim 1, wherein said central shaft further comprises an air extraction tube at each of said levels for diverting the air from each level as deemed optimal.

3. A device as in claim 1, wherein said monitors in each of said levels further comprise means for monitoring temperature, means for monitoring moisture level, and means for monitoring oxygen concentration.

4. A device as in claim 1, wherein said silo further comprises:

compost entry means for introducing compostable material into the upper portion of said silo;

sludge entry means for introducing sewage sludge into the upper portion of said silo;

diverter means at the upper portion of said silo to direct said compostable material into said silo;

oxygen supply means to deliver oxygen to each of said discrete levels of said silo;

air extraction means to control air in each of said discrete levels of said silo; and material extraction means at the lower portion of said silo.

5. A device as in claim 1, wherein said silo further comprises means for directing a quantity of said composting material from each or any of said discrete levels back to said upper portion of said silo.

6. A device as in claim 1, wherein said silo further comprises means for mixing herbaceous material with sewage sludge.

* * * * *